Dec. 29, 1959
J. F. NENZELL
2,919,147
ADJUSTABLE, LOCKABLE MALE THREADED
FITTING AND SEAL THEREFOR
Filed Jan. 4, 1954
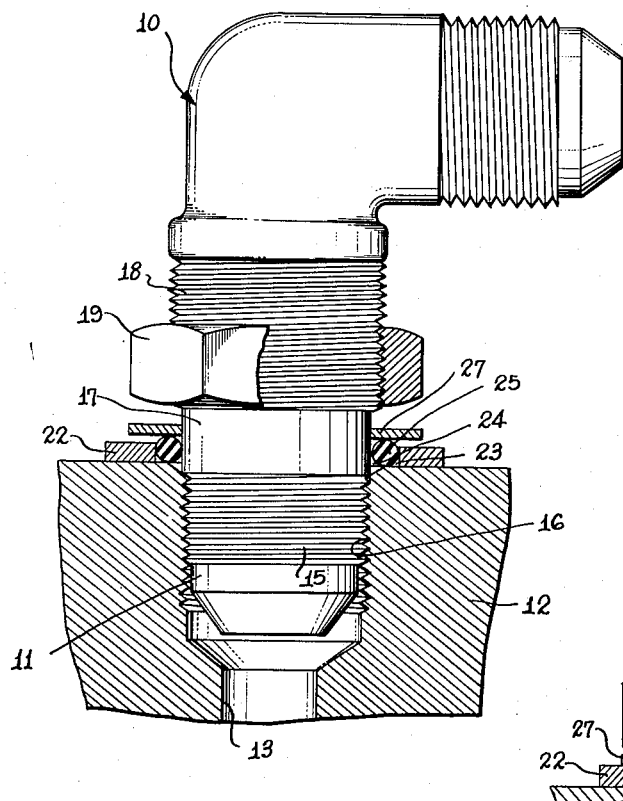
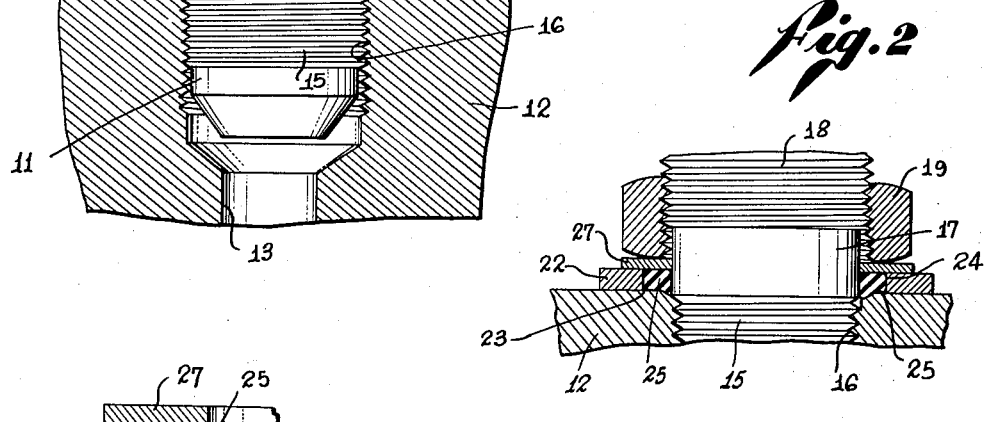
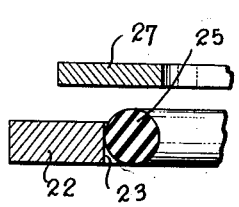
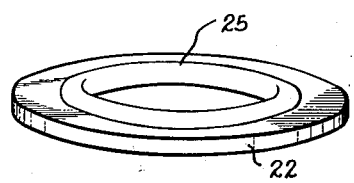
INVENTOR.
JOSEPH F. NENZELL
BY
Fulwider Mattingly & Bobcock
Attorneys United States Patent Office 2,919,147
Patented Dec. 29, 1959

2,919,147
ADJUSTABLE, LOCKABLE MALE THREADED FITTING AND SEAL THEREFOR

Joseph F. Nenzell, Culver City, Calif., assignor to Parker-Hannifin Corporation, Cleveland, Ohio, a corporation of Ohio Application January 4, 1954, Serial No. 401,818

3 Claims. (Cl. 285—89)

My invention relates generally to fittings on connectors and more particularly to a modified male threaded fitting and means for sealing around the opening into which the fitting is received.

A typical example of the use of the invention is in hydraulic or fluid systems wherein tubing and hose are connected to housing ports by coupling fittings which are threadedly engaged into the wall of the housing structure surrounding the port.

It is to be understood, however, that the use of the invention is not confined to tubular fittings, but may be used with any type of male threaded fitting. In all types of fittings the common problem is that the threaded engagement between the fitting and the wall structure is not sufficiently fluid-tight to prevent high pressure leakage. Furthermore, expansion and contraction of the joint due to changes in temperature and pressure cause additional fluid leakage. To overcome such fluid leakage it is conventional to use a semi-plastic sealing compound which is adapted to fill up the spaces between the engaging threads and thus form a fluid-tight seal.

There are numerous disadvantages to the use of sealing compounds. One trouble caused by the use of sealing compounds is that removal of the fittings is made difficult as the compound hardens. After removal, the fitting must be thoroughly cleaned and repacked with sealing compound before re-installation, and considerable labor is involved. Additionally, sealing compounds are not well adapted for withstanding high temperatures and corrosive fluids.

Attempts have been made to avoid the use of sealing compounds by providing deformable gaskets or packing members which can be engaged around the fitting and against the adjacent structure. However, it is very difficult to obtain good engagement or contact of the packing member against the threaded shank of the fitting so as to prevent leakage. Furthermore, the cutting action of the threads upon the packing member is such as to prevent reuse of the packing upon removal and re-installation of the fitting.

With the foregoing in mind, this invention contemplates a modified construction for the threaded fitting wherein it is provided with a non-threaded sealing land adapted to be positioned at the face or surface of the mating part. The fitting is provided with a resilient deformable packing member which is adapted to fit tightly against the land and the surface of the mating member. Preferably, the packing member is of toroidal shape and is confined within a rigid retainer ring or washer in the manner disclosed in Patent No. 2,396,005, for Sealing Device, issued March 5, 1946.

In order to deform the packing ring into tight sealing engagement with the adjacent structure, a locking washer is closely fitted to the sealing land outwardly of the retaining body. Beyond the sealing land, the fitting has an enlarged threaded portion on which is positioned a lock nut. The lock nut may be pulled down tightly against the locking washer so as to deform the packing ring into sealing engagement with the adjoining structure. At the same time, the fitting is positively locked against rotation by the lock nut so that it cannot be accidentally displaced.

A major object of the invention is to provide a modified construction for a male threaded fitting of any type and cooperating sealing means adapted to seal the fitting tightly against the mating structure.

An equally important object of the invention is to provide sealing means of the character described which permit rapid installation and removal of the fitting and are re-usable upon re-installation.

It is another object of the invention to provide sealing means of a positive character in which the packing member is confined within rigid structure and is protected against deterioration.

A further object of the invention is to provide a threaded connector having a sealing land for cooperation with the sealing means and an enlarged threaded portion carrying a lock nut.

It is also an object of the invention to provide sealing means including a rigid retaining body and a locking body for deforming and confining a packing member against the sealing land of the fitting and the adjacent structure.

Still another object of the invention is to provide a self-sealing fitting which is of simple and rugged construction and is economical to manufacture.

These and other objects and advantages of my invention will become apparent from the following detailed description of a preferred form thereof, and from an inspection of the accompanying drawings in which:

Figure 1 is a sectional view of a wall structure and fitting secured therein which embodies the invention;

Figure 2 is a partial sectional view of the fitting and sealing means deformed into sealing engagement;

Figure 3 is an enlarged sectional detail of the packing member and retaining washer; and Figure 4 is a perspective view of the sealing means.

Referring now to the drawings and particularly to Figure 1 thereof, I have chosen to illustrate a male threaded fitting 10 which is typically a tubular elbow coupling adapted for connecting a hose or tubing in a fluid system. Fitting 10 has a threaded shank 11 which is engaged within a wall structure 12 that may be a portion of a tank or other fluid-tight vessel. Wall 12 has a port 13 communicating with the interior of fitting 10, and it is necessary to prevent fluid leakage through the normal clearance which exists between the threads of the shank 11 and the mating threads of the wall. It is to be understood that the fitting 10 is merely illustrative and that the invention may be embodied in a fitting of any shape or type.

Considered in greater detail, the shank 11 is cylindrical and has an exteriorly threaded inner end portion 15 which is of a length to fit within an interiorly threaded bore 16 in wall 12. Outwardly of the end portion 15, shank 11 is formed with a non-threaded land 17 which acts as a sealing surface and is of relatively short length. Land 17 is of substantially the same diameter as end portion 15 and is adapted to lie at the outer face or surface of wall 12 by moving end portion 15 completely into bore 16.

Outwardly of land 17, shank 11 has a further threaded portion 18 of enlarged diameter. The diameter of threaded portion 18 is made sufficiently great so that the root diameter across the threads thereof is at least as large as the diameter of land 17 and preferably approximately the same. Fitted threadedly upon portion 18 is a lock nut 19 of conventional wrench engaging polygonal shape. Nut 19 is normally positioned fully upon threaded portion 18, but may be pulled down partially over land 17, as seen in Figure 2, by reason of the dimensional relationship just described.

Surrounding land 17 and adapted to seat against the surface of wall 12, is a flat annular retainer ring or washer 22 which is of rigid metallic construction. Ring 22 has a bore 23 which is of greater diameter than land 17 and defines therewith an annular retaining groove 24 of rectangular cross section. As is best seen in Figures 3 and 4, the ring 22 is fitted with a resilient deformable packing member or ring 25 which is adapted to closely surround land 17. Ring 25 is made of rubberlike material, preferably a synthetic rubber which is resistant to most fluids and maintains its resilience over a wide temperature range. Ring 25 is preferably of toroidal or O-ring shape and has a volume which is substantially the same as groove 24. By reason of the difference in shape of groove 24 and ring 25, the latter has an undeformed thickness considerably greater than that of ring 22 and projects above the latter as may be seen in Figure 3.

Mounted between lock nut 19 and retainer ring 22 is a flat lock washer 27 which makes a close sliding fit on land 17 and extends outwardly to overhang the retainer ring. Lock washer 27 is also formed of rigid metallic construction and is adapted to bear downwardly against packing ring 25 and seat against retainer ring 22.

It will be noted that the axial length of land 17 is considerably greater than the combined thickness of lock washer 27 and the undeformed sealing ring 25. For this reason the fitting 10 may be fully seated within housing 12 before any deformation of the sealing ring 25 takes place and under normal conditions the fitting will freely hand thread into the housing without the use of a wrench. This is highly advantageous from two standpoints, first the fitting may be of such a nature that it is not convenient or desirable to apply a wrench to it, as for example the elbow fitting illustrated. Secondly, and of even greater importance is the fact that the ring 25 should be deformed only against the smooth land 17 and not against the threads 15. If the deformation occur before the fitting is fully seated, there will be considerable resistance to its further rotation and the top of the shank threads 15 will be left projecting above the outer surface of the housing so that the ring 25 is forced into engagement with these threads. This will severely cut and damage the ring and prevent its reuse.

After fitting 10 has been properly engaged within wall 12, lock nut 19 is tightened downwardly over land 17, as seen in Figure 2. Washer 27 is forced downwardly until it seats on retainer ring 22, and the latter is forced into tight frictional engagement with the surface of wall 12. Thus it can be seen that lock nut 19 serves to hold fitting 10 against rotation with metal-to-metal contact in an advantageous manner.

As washer 27 seats downwardly against ring 22, packing ring 25 is deformed resiliently and confined within groove 24. The deformation of ring 25 forces it tightly against the surface of land 17 and at the same time against the outer face of wall 12. The tight frictional engagement of ring 25 upon the adjacent surfaces of the wall and fitting is sufficient to prevent fluid leakage even under high pressures.

It should be noted that packing ring 25 is confined entirely within rigid metal elements and accordingly cannot be extruded beyond its elastic limit by the action of fluid under high pressure. The confinement of ring 25 also tends to protect it against external pressure and temperature changes. Since ring 25 engages only against the smooth surface of land 17 and not the threaded portions of the fastener, very good sealing contact is possible. Also, there is no cutting action of the fitting threads upon ring 25 and it may be re-installed many times.

As can be appreciated, I have described in some detail an embodiment of my invention which is adaptable to any type of male threaded fitting and may be economically produced. Changes of design and construction will be apparent to those skilled in the art, and I do not wish to be restricted except as defined in the appended claims.

I claim:

1. Means for sealing a male threaded fitting into a wall structure comprising: a fitting shank having a threaded end portion engaging in said wall structure, a non-threaded cylindrical sealing land adjacent to said end portion, and a threaded portion outwardly of said land; a retainer ring of rigid material having a central bore surrounding said land and defining therewith an annular retaining groove of rectangular cross section; a resilient deformable packing ring fitted within said groove, said packing ring having a volume substantially equal to the volume of said groove and a cross sectional shape such that the surface of said packing ring facing said land is generally convex, and the undeformed thickness of said ring is greater than the thickness of said retainer ring; a lock washer mounted in close sliding engagement on said land outwardly of said retainer ring, the axial length of said land being at least as great as the combined thickness of said undeformed packing ring and lock washer; and a lock nut mounted on said outer threaded portion and adapted to be tightened inwardly to resiliently deform said packing ring against said land and the surface of said wall structure.

2. Means for sealing a male threaded fitting into a wall structure comprising: a fitting shank having a threaded end portion engaging in said wall structure, a non-threaded cylindrical sealing land adjacent to said end portion and an enlarged threaded portion outwardly of said land; a retainer ring of rigid material having a central bore surrounding said land and defining therewith an annular retaining groove of rectangular cross section; a resilient deformable packing ring fitted within said groove, said packing ring having a volume substantially equal to the volume of said groove and a cross sectional shape such that the surface of said packing ring facing said land and said wall structure are generally convex, and the undeformed thickness of said ring is greater than the thickness of said retainer ring; a lock washer of rigid material mounted in close sliding engagement on said land outwardly of said retainer ring; the axial length of said land being at least as great as the combined thickness of said undeformed packing ring and lock washer; and a lock nut mounted on said enlarged threaded portion and adapted to be tightened inwardly over said shank and against said lock washer to resiliently deform packing ring against said land and the surface of said wall structure.

3. Means for sealing a male threaded fitting into a wall structure comprising: a cylinder fitting shank having a threaded end portion engaging in said wall structure, a non-threaded cylindrical sealing land adjacent to said end portion and of substantially the same diameter, and an enlarged threaded portion outwardly of said land having a thread root diameter at least as great as the diameter of said end portion; a flat retainer ring of rigid material having a central bore surrounding said land and defining therewith an annular retaining groove of rectangular cross section; a resilient deformable packing ring of toroidal shape fitted in said groove and having a volume substantially equal to the volume of said groove; a lock washer of rigid material mounted in close sliding engagement on said land outwardly of said retainer ring, the axial length of said land being at least as great as the combined thickness of said undeformed packing ring and lock washer; and a lock nut mounted on said enlarged threaded portion and adapted to be tightened inwardly over said shank and against said lock washer to resiliently deform said packing ring against said land and the surface of said wall structure.

References Cited in the file of this patent

UNITED STATES PATENTS

| | | |
|---|---|---|
| 2,199,647 | Mueller et al. | May 7, 1940 |
| 2,342,425 | Parker | Feb. 22, 1944 |
| 2,373,253 | Martin | Apr. 10, 1945 |
| 2,396,005 | Gross et al. | Mar. 5, 1946 |
| 2,476,074 | Unger | July 12, 1946 |